United States Patent [19]
Kommareddi et al.

[11] Patent Number: 6,126,872
[45] Date of Patent: Oct. 3, 2000

[54] MICROENCAPSULATED DRAG REDUCING AGENTS

[75] Inventors: Nagesh S. Kommareddi, Tulsa, Okla.; Lawrence J. Rzeznik, Spring, Tex.

[73] Assignee: Baker Hughes Incorporated, Houston, Tex.

[21] Appl. No.: 09/014,218

[22] Filed: Jan. 27, 1998

[51] Int. Cl.[7] ............... B01J 13/02; B01J 13/04; B01J 13/20; B05D 7/00
[52] U.S. Cl. ............ 264/4.1; 264/4.3; 264/4.32; 264/4.33; 264/4.4; 264/4.6; 264/4.7; 427/213.3; 427/213.31; 427/213.34
[58] Field of Search ............ 264/4.1, 4.3, 4.32, 264/4.33, 4.4, 4.6, 4.7; 427/213, 213.3, 213.31, 213.32, 213.33, 213.34, 213.35, 213.36

[56] References Cited

U.S. PATENT DOCUMENTS

| | | | |
|---|---|---|---|
| 4,588,640 | 5/1986 | Matlach | 428/407 |
| 4,659,334 | 4/1987 | Matlach | 44/51 |
| 4,693,321 | 9/1987 | Royer | 137/13 |
| 5,504,131 | 4/1996 | Smith et al. | 524/401 |
| 5,504,132 | 4/1996 | Smith et al. | 524/401 |
| 5,539,044 | 7/1996 | Dindi et al. | 524/570 |
| 5,605,966 | 2/1997 | Schuler et al. | 525/125 |
| 5,733,953 | 3/1998 | Fairchild et al. | 523/336 |

FOREIGN PATENT DOCUMENTS

93/22537  11/1993  WIPO .

OTHER PUBLICATIONS

J. Franjione, et al., "The Art and Science of Microencapsulation," *Technology Today*, Jun. 1995.

*Primary Examiner*—Nathan M. Nutter
*Attorney, Agent, or Firm*—Madan, Mossman & Sriram P.C.

[57] ABSTRACT

High concentration drag reducing agents may be prepared by microencapsulating polymer drag reducing agent. The microencapsulation may be performed prior to, during, or after the polymerization of monomer into effective drag reducing polymer. If encapsulation is done before or during polymerization, a catalyst may be present, but little or no solvent is required. The result is very small scale bulk polymerization within the microcapsule. The inert capsule or shell may be removed before, during or after introduction of the microencapsulated drag reducer into a flowing liquid. No injection probes or other special equipment is expected to be required to introduce the drag reducing slurry into the liquid stream, nor is grinding (cryogenic otherwise) of the polymer necessary to form a suitable drag reducing agent.

22 Claims, 1 Drawing Sheet

6,126,872

MICROENCAPSULATED DRAG REDUCING AGENTS

FIELD OF THE INVENTION

The invention relates to microencapsulating compounds to be added to fluids to modify a characteristic thereof, more particularly to agents to be added to fluids flowing through a conduit to reduce the drag therethrough, and most particularly to microencapsulated drag reducing agents (MDRAs) for liquids such as hydrocarbons, aqueous solutions, and emulsions of water and hydrocarbons. The drag reducing agents are encapsulated in a shell which is removed prior to, during or after introduction of the MDRA in the flowing fluid.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries of ground polymers to form particulates. A problem generally experienced with simply grinding the polyalpha-olefins (PAOs) is that the particles will "cold flow" or stick together after the passage of time, thus making it impossible to place the PAO in the hydrocarbon in a form that will dissolve or otherwise mix with the hydrocarbon in an efficient manner. Further, the grinding process degrades the polymer, thereby reducing the drag reduction efficiency of the polymer.

One common solution to preventing cold flow is to coat the ground polymer particles with an anti-agglomerating agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream.

Gel or solution DRAs have also been tried in the past. However, these drag reducing gels also demand specialized injection equipment, as well as pressurized delivery systems. They are also limited to about 10% polymer as a maximum concentration in a carrier fluid due to the high solution viscosity of these DRAs. Thus, transportation costs of the DRA is considerable, since up to about 90% of the volume is inert material.

Thus, it would be desirable if a drag reducing agent could be developed which rapidly dissolves in the flowing hydrocarbon, which could minimize or eliminate the need for special equipment for preparation and incorporation into the hydrocarbon, and which could be formulated to contain much greater than 10% polymer.

SUMMARY OF THE INVENTION

Accordingly, it is an object of the present invention to provide a DRA that does not require grinding of a polymer.

Another object of the invention is to provide a high solids DRA that does not require the use of a gel or solution DRA as the raw material.

Other objects of the invention include providing a DRA that can be readily manufactured and which does not require special equipment for placement in a conduit transporting hydrocarbons or other fluids.

Another object of the invention is to provide a DRA which does not cold flow upon standing.

In carrying out these and other objects of the invention, there is provided, in one form, a microencapsulated compound for modifying a characteristic of a fluid, which includes a core containing the compound, and a shell encapsulating the core, where the shell is inert to the core. The compound inside the microcapsule may modify the physical and/or chemical characteristics of the fluid. Physical characteristics of the fluid modified by such compounds may include, but are not limited to, viscosity (e.g. thickeners and the like), flow resistance (drag), and surface activity (e.g. surfactants and the like), and the like. Chemical characteristics of the fluid modified by such compounds, may include, but are not limited to, corrosivity, scale formation, polymerization, inhibition of polymerization, pH, and the like. The compound that is microencapsulated may be already formed polymers, and/or monomers which are to be polymerized within the shell, where the shell is inert to the monomer polymerization.

In another embodiment of the invention, there is provided, in another form, a microencapsulated drag reducing agent (MDRA) for reducing drag in a liquid stream. The MDRA has a core reactive material which includes a monomer, possibly solvent for the monomer and eventual polymer from the monomer, and a shell which encapsulates the core reaction material. The shell is inert to the monomer polymerization. Polymerization occurs by known mechanisms during, before or after encapsulation. The outside diameter of the MDRA may be from about 20 to about 1000 microns. The shell is removed before, during or after the introduction of the MDRA into the flowing fluid.

DETAILED DESCRIPTION OF THE INVENTION

Figure 1:
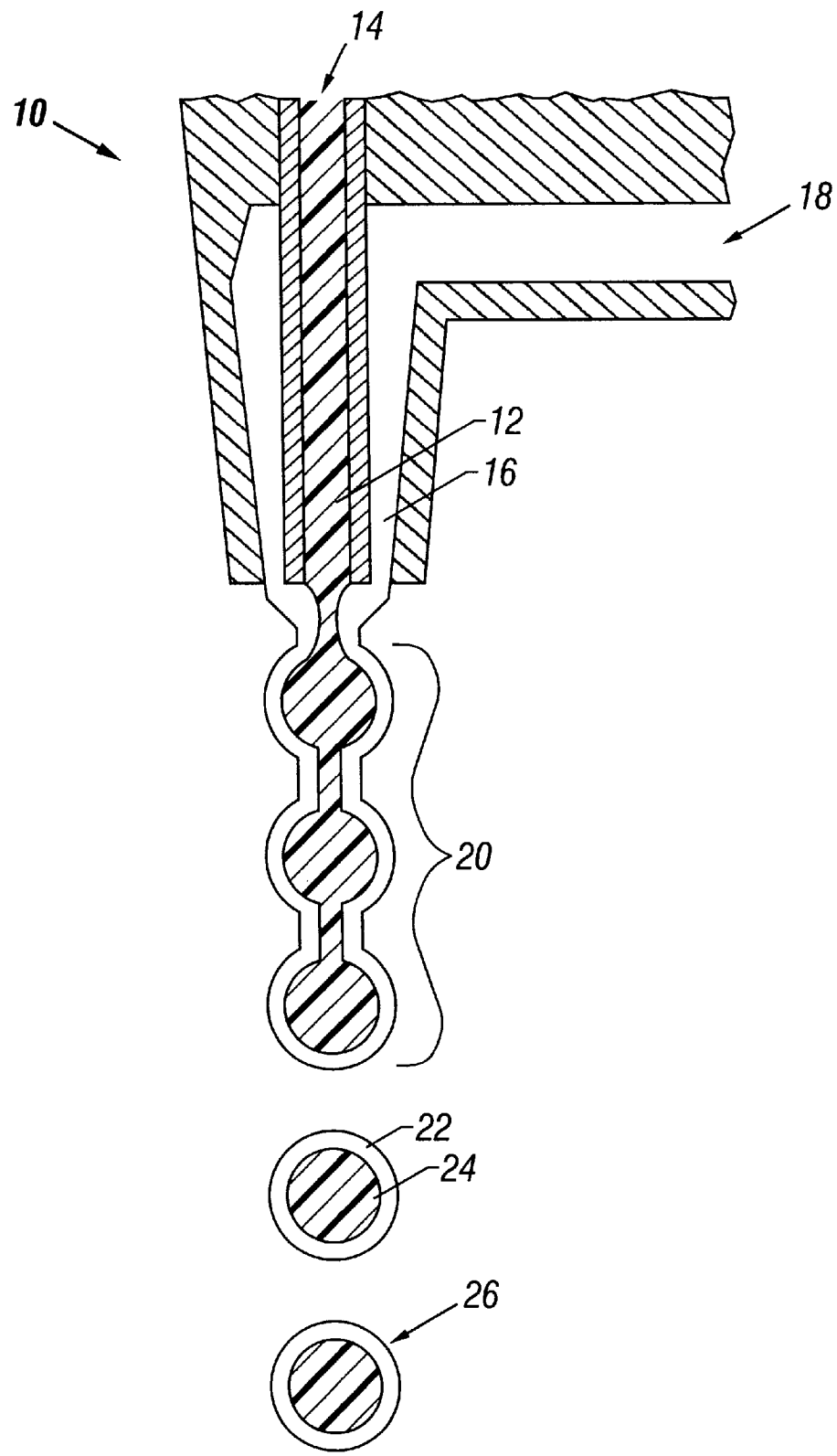
FIG. 1 is a detailed, sectional view of a stationary extrusion nozzle forming microencapsulated drag reducing agent by axisymmetric jet breakup.

High concentration drag reducing agent may be encapsulated in an inert shell before, during, and or after polymerization of the monomer in the core reaction material. Microencapsulated drag reducing agent (MDRA) may then be introduced into a flowing fluid stream, such as an aqueous solution, a hydrocarbon stream, an emulsion of water and a hydrocarbon, etc. The shell may be removed from the polymerized core before, during, and/or after the MDRA is placed in the fluid stream. It most cases, it will be preferred that the shell is removed just prior to, during and/or after introduction of the MDRA into the fluid.

It has further been discovered that microencapsulation is an ideal way of delivering nearly any compound into a fluid where the compound may modify a characteristic of the fluid, and particularly where it is useful or desirable to keep the compound in a particulate, flowable form. For example, it may be desirable to deliver an acidic component to a remote location, such as the production zone at the bottom of an oil well bore without exposing the entire production string to the acid. The acid may be microencapsulated in a shell which would melt or dissolve only at the temperature of the production zone and not before.

Microencapsulation

Microencapsulation is known technology. However, the use of microencapsulation techniques to encapsulate monomers that are to be polymerized into drag reducing polymers; monomers being polymerized; and preformed high concentration, precipitated polymers, and the like is unknown. The microencapsulation provides a shell around the drag reducing polymer which keeps the polymer from agglomerating or "cold flowing" together into an intractable mass. Thus, the MDRA may be easily handled in dry, particulate form and transported at low cost without having to ship a solvent, carrier or slurry agent with it. If a solvent or carrier (i.e. a delivery medium) is necessary to inject the MDRA into the fluid stream, this can be provided locally at low cost. Then, before, during or after introduction of the MDRA into the stream, the shell is removed.

Microencapsulation techniques suitable for the MDRAs of this invention include, but are not necessarily limited to stationary extrusion, centrifugal extrusion, vibrating nozzle, submerged nozzle extrusion, rotating disk, interfacial polymerization, complex coacervation, suspension polymerization, and in situ polymerization. Shown in FIG. 1 is a detailed, cross-sectional view of a stationary extrusion nozzle 10 having a central bore 12 for introduction of core material 14 and a surrounding annulus 16 for extrusion of the shell material 18. Different phenomena are observed when the materials 14 and 18 are extruded at different rates, i.e. the mode of compound drop formation changes. At low flow rates, drop formation is orderly and regular and the drops are uniform. At higher flow rates, compound drops 20 form due to axisymmetric breakup of the jet of combined materials. At still higher flow rates, breakup of the jet occurs via different mechanisms and the capsule size distribution is much broader, which is usually less desirable. If the nozzle 10 is vibrated during axisymmetric breakup, capsule size distribution can be controlled to give capsules having relatively uniform diameter cores 22 and shells 24. The production rates of the MDRAs 26 is thus maximized for a given, relatively narrow size distribution.

Microencapsulation of a compound, such as a drag reducing agent (DRA) could be performed by first providing a slurry of DRA polymer particles in a liquid which is a non-solvent for the polymer particles. Next, a shell material is added to the slurry. The shell material could be in particulate form and insoluble in the non-solvent to the DRA polymer. At elevate temperatures, the particulate shell material could melt into a liquid and coat the DRA particles. For example, if the shell material is hydrophobic as well as insoluble in the non-solvent, then it would coat the DRA particles. In one preferred non-limiting embodiment, the shell material could also be soluble in the non-solvent for the DRA polymer. In these situations, the shell material will be coated onto the DRA particles, by the precipitation of the shell material when the liquid non-solvent is removed. In one non-limiting embodiment of the invention, the ratio of average diameter of the shell particles (which could be a different kind of polymer from the core DRA particles) to core DRA polymer particles is from about 1.02:1.0 to about 2.7:1.0, preferably from about 1.1: .0 to about 1.26:1.0. Next, at least a portion of the non-solvent liquid is removed; it is preferred that as much as possible of the non-solvent liquid is removed, even all of it, although some diminishingly small amount may remain due to the incomplete ability of conventional removal processes. Microencapsulation processes to make the MDRA according to this last method may include, but are not necessarily limited to rotating disk, interfacial polymerization, complex coacervation, suspension polymerization processes an the like.

Core Material

In one embodiment of the invention, the core 2, is a monomer which, when polymerized, forms a polymer suitable for use as a drag reducing agent (DRA). Such monomers are well known in the art and include, but are not necessarily limited to, alpha-olefins, such as 1-hexene, 1-octene, 1-decene, 1-dodecene, 1-tetradecene, and the like; isobutylene; alkyl acrylates; alkylmethacrylates; alkyl styrene; and the like. Copolymers of these monomers may also make suitable drag reducing agents. Polymers and copolymers from the aforementioned monomers are suitable hydrocarbon drag reducers.

Aqueous drag reducers (for reducing drag of water and aqueous solutions) may include, but are not necessarily limited to, copolymers of acrylamide; sodium acrylate; sodium 2-acrylamido-2-methyl propane sulfonate; N-isopropyl acrylamide; and the like. Of course, the drag reducing polymer must be soluble in the fluid into which it is introduced so that it may improve its fluid flow characteristics. For example, a polymer used to improve the fluid flow of a hydrocarbon, such as crude oil, could be a polyalpha-olefin. Polyalpha-olefins would not be suitable as a DRA for an aqueous fluid.

Polyalpha-olefins, which in one embodiment are preferred herein, are polymerized from the monomers or comonomers by conventional techniques and will have molecular weights above 10 million per analysis by gel permeation chromatography (GPC). Polyalpha-olefins particularly suitable for the processes and compositions of this invention include the FLO® family of PAO DRAs, including FLO® 1004, FLO® 1005, FLO® 1008, FLO® 1010, FLO® 1012, FLC® 1020 and FLO® 1022 DRAs sold by Baker Pipeline Products, a division of Baker Petrolite Corporation. These DRAs are used for hydrocarbon streams.

A particular advantage of the microencapsulation technique of this invention is that the polymerization may be conducted entirely within the microcapsule under small scale bulk polymerization conditions in the absence of a solvent, or in the presence of only a very small amount of solvent. Conventionally, production of the very high molecular weight polymers useful as DRAs necessarily is done at high dilutions in a suitable solvent. Removal of large amounts of solvent thus becomes an issue, since transportation of large amounts of ineffective solvent to the site of drag reduction is an unnecessary expense. However, in the microencapsulation process, very little or no solvent is required, and the polymerization reaction may be conducted within the microcapsule by conventional techniques. Very high molecular weight DRAs may be produced, for example on the order of 10 million weight average molecular weight or more.

For example, the polymerization of certain monomers may be conducted by the inclusion of a catalyst immediately prior to extrusion through nozzle 10, in a non-limiting example. In the case of alpha-olefins, polymerization may be conducted by the inclusion of a Ziegler-Natta catalyst just prior to droplet or capsule formation. Metallocenes are useful catalysts for polymerizing some monomers. Care must be taken to avoid poisons for particular catalysts or polymerizations. For example, if Ziegler-Natta catalyst are used to polymerize α-olefins, the presence of oxygen must be avoided, since oxygen is a poison for these catalysts. Certain monomers may be polymerized by the use of UV radiation to initiate reaction. In such a system, the shell 24 would have to be transparent to the frequency of the radiation necessary to initiate polymerization of the monomer in the core 22.

Certain core polymerization systems may need to be kept in a temperature controlled environment to complete the polymerization. For example, in an exothermic polymerization, it may be necessary to keep the microcapsules cooled below a certain temperature to complete the polymerization and formation of the core 22 prior to warming and use.

Further, it is possible to encapsulate already polymerized monomer, although in most cases, it is expected that this technique will only give a dilute product. For example, core material 14 extruded through nozzle 10 could be a liquid material which is ready for use as a DRA, such as a suspension or a slurry of DRA polymer in a carrier, such as a liquid, non-solvent. Slurry concentrates having low viscosity and a high concentration of DRAs are described as being made through a carefully controlled precipitation process in U.S. Pat. No. 5,733,953 incorporated by reference herein. In one embodiment of the precipitation process, a high molecular weight polyalpha-olefin (PAO) is polymerized from the monomer or monomers in a solvent for α-olefin monomers. A suitable non-solvent for the polymers is slowly added to the neat drag reducer, which is simply the PAO in the solvent in which the polymerization occurs. The non-solvent must be added at a rate that will allow the drag reducer mixture to absorb the non-solvent. This rate depends on the amount of agitation in the mixing system used. If the rate of non-solvent addition is too high, it will make a precipitate that is not uniform in size with particles too large in size for use as a DRA in slurry form, and will contain undesirably high amounts of solvent. During the addition, the neat drag reducer will go through a viscosity reduction until the PAC, precipitates. At this point, the mixture becomes a slurry concentrate of precipitated polymer particles. The weight ratio of liquid, non-solvent to solvent at this point may range from about 70/30 to 30/70, where, in one non-limiting, preferred embodiment, the ratio is about 50/50.

In some cases, the slurry concentrate will cold flow if not agitated. To reduce or prevent the cold flow, it will be necessary to remove most of the solvent. Also, the addition of blocking agents such as metal stearates and finely ground inorganic clays, can help in preventing cold flow. Solvent removal can be accomplished by evaporating the solvent by heating or applying a vacuum or a combination of both. Another method would be to remove at least 50% of the solvent/liquid, non-solvent mixture and replace it with additional non-solvent. This lowers the amount of solvent in the precipitated polymer. The mixture of solvent and liquid, non-solvent would again be removed and replaced with fresh non-solvent, to further reduce the amount of solvent in the system. This process could be repeated until the desired level of residual solvent in the system was reached. By either technique, the DRA polymer could be easily concentrated to at least 15 wt %. The slurry may now be encapsulated according to this invention. In one embodiment of the precipitation process, additional solvent may be removed from the slurry concentrate by evaporating, such as through vacuum drying or other techniques, prior to microencapsulation.

It will be appreciated that the above-described preparation is analogous to a two-step extraction. However, since precipitation is also occurring in the first step, the rate of addition of the liquid, non-solvent must be carefully controlled. In one embodiment, the liquid, non-solvent is added to a point where the polymer precipitates into polymer particles of average diameter equal or less than 0.10" (0.25 cm). For the MDRA invention herein, the core material 14 may contain from about 0.5 to about 50 wt % DRA polymer, preferably between 0.5 to about 35 wt. %, where over half of the remainder would be liquid, non-solvent for the the DRA polymer. Some very small amount of solvent for the monomer may be present; it is desirable to remove as much of the solvent as possible prior to encapsulation.

Shell Material

The shell material 18 must meet a variety of parameters. It must be inert with respect to the core material 14, for example, the liquid or semi-liquid core material 14 (e.g., in monomer form) or semi-liquid or solid core 22 (e.g., in polymerized form) and the liquid or semi-liquid shell material 18 (e.g. in monomer form) or solid shell 24 (e.g., in polymerized form) must not be soluble with each other, respectively. Unformed or semi-formed shell material 18 or formed shell 24 must not interfere with the polymerization occurring in the core 22, if the polymerization is not yet complete. Further, the shell 24 must be able to be removed at the correct time so that the core material can perform as a DRA on the flowing fluid. If the shell 18 is itself a polymer, which is acceptable within the scope of this invention, then the requirements of the polymerization of the shell material 18 must be balanced with the requirements of the rest of the MDRA system.

In the case of a-olefins for core material 14, suitable shell materials may include, but are not necessarily limited to, polybutylene, polymethacrylates, waxes, polyethylene glycol (PEG), methoxylated PEG, polyethylene oxide, polyethylene waxes, and stearic acid. Polymerization of these polymer shells is well known in the art. Shell materials for polyalpha-olefins (PAOs) must avoid the inclusion of molecular oxygen, $O_2$, but also the presence of oxygen in the form of hydroxyl groups, —OH. Further, it is possible that the presence of carbonyl groups in the shell 24 may also poison the catalyst. It is also possible that a small number of —OH or carbonyl groups in the shell can be tolerated.

Additionally, the shell 24 must be a material which will not adversely affect the ultimate use of the fluid flowing in the conduit. For example, if the conduit is carrying a hydrocarbon stream which will ultimately be used for gasoline, the particulate or soluble remnants from the shell 24 must not adversely affect carburetor, engine, or other performance.

The shell 24 may be removed in a variety of ways, including, but not necessarily limited to, dissolution in the liquid stream, mechanical breakdown, melting, photochemical breakdown, biodegradation, and combinations thereof. It would be unusual, for both the shell 24 and the core 2 to be soluble in the flowing liquid stream, since it would then be very likely that shell 24 and core 22 would be mutually soluble, which would be undesirable. However, it might be possible for both the shell 24 and the core 22 to be soluble in the flowing liquid stream if shell 24 was readily soluble in the liquid stream, and shell 24 relatively insoluble in core 22. Another possibility is that shell material 18 might form a skin upon exposure to air or other gas, where the shell would remain relatively intact during shipping of the MDRA, but which skin would not be soluble in the core 22 or a possible mixture of shell material 18 with core 22. Such a skin would be the actual shell 24, which would have to be removed in some way.

An example of mechanical breakdown would be ultrasonic vibration of the MDRAs just prior to, during or after insertion into the liquid stream. Melting would involve an increase in temperature to remove the shell, for example, if the shell 24 was made of a natural or synthetic wax. Photochemical breakdown would include the use of radiation, such as UV, to deteriorate for example, a polymer shell 24, made of polymethyl methacrylate, polyisobutylene, or poly(α-methylstyrene). Biodegradation would include the use of a biological agent to remove the shell.

In one embodiment of the invention, the outside diameter of the MDRA (outside diameter of shell 24) is about 5000 microns or less, preferably about 1000 microns or less, and in another embodiment about 500 microns or less. The core 228 has an outside diameter of about 2500 microns or less, preferably about 500 microns or less, and most preferably about 250 microns or less. In a different embodiment of the invention, the outside diameter may range from about 10 to about 150 $\mu$m. Twenty microns, in one embodiment, is a lower limit of the outside diameter. This means that the thickness of shell 24 may range from about 1250 microns or less, preferably about 250 microns or less, and most preferably about 62.5 microns or less. It will be appreciated that these dimensions can vary greatly over a wide range depending on a number of complex factors including, but not limited to, the nature of the shell 24, core 22, and the flowing liquid; the rates of removal of shell 24 and rate of dissolution of core 22 into the flowing liquid; the flow rate of the liquid; the anticipated shelf life of the MDRA, etc. It is thus very difficult to give precise dimensional limits on the MDRA physical parameters.

Optional Anti-agglomeration Agents

It is expected that most, if not all, MDRAs prepared according to the process of this invention will not require the addition of an optional anti-agglomeration agent to reduce or prevent the tendency of the MDRA to cold flow after formation. Indeed, the use of a shell 24 or microcapsule is to avoid this problem. Nevertheless, in other cases it may be desirable to add an anti-agglomeration agent during or after formation of shell 24.

In one embodiment, the weight of the anti-agglomeration agent added to the MDRA 26 is approximately equal to or less than the weight of the MDRA 26 itself. In another embodiment, it is preferred that the amount of anti-agglomeration agent range from about 75% to about 25% of the MDRA 26. Suitable anti-agglomeration agents include, but are not limited to, salts of fatty acids having 12–20 carbon atoms, specifically alkali earth metal salts of such acids, which may include, but are not limited to, magnesium stearate and calcium stearate; as well as silicones.

Delivery Media

The MDRAs of the present invention may be placed in a delivery medium prior to introduction into the liquid stream or flowing fluid to affect its friction or drag properties. The shell of the DRA may be soluble in the delivery media so that the shell dissolves at a rate suitable to deliver the core containing the DRA polymer into the liquid stream. In turn, the core is soluble in the liquid stream or flowing fluid.

Thus, for example in a system where a MDRA shell is inert to hydrocarbons, but soluble in water, the delivery medium may be water or an aqueous solution, for delivering the MDRA and its polymer to a hydrocarbon fluid flowing in a pipeline.

Use of MDRAs in Flowing Fluid

It will be appreciated that the amount of MDRA added to any particular hydrocarbon, aqueous solution, or emulsion will vary greatly depending on a number of factors and cannot be specified in advance or in general. For example, some of the parameters affecting the proportion of MDRA to be added include, but are not limited to, the chemical nature of the fluid being transported, the temperature of the fluid being transported, the viscosity characteristics of the fluid, the ambient temperature of the pipeline environment, the nature of the MDRA itself (both shell and core), etc. However in some cases, the amount of MDRA injected into the flowing hydrocarbon stream will range from about 3 to about 100 ppm, or higher; preferably from about 3 to about 50 ppm, measured as ppm of active polymer in the MDRA introduced into the fluid.

The invention will be demonstrated further with reference to the following Examples which are meant only to additionally illustrate the invention and not limit it.

EXAMPLE 1

In this Example, a vibrating nozzle technique would be used. The nozzle center bore 12 would have a diameter of 125 $\mu$m, where the annulus 16 would have an inner diameter of 130 $\mu$m and an outer diameter of 250 $\mu$m. The nozzle 10 would vibrate back and forth at a frequency of about 700 Hz to about 1000 Hz.

The core material 14 would be a mixture of alpha-olefins to give a copolymer of polyalpha-olefins as the core 22. A Ziegler-Natta catalyst, in combination with suitable activators, would be added to the core material 14 just prior to its extrusion into the nozzle 10. The Ziegler-Natta catalyst to be used would be $TiCl_3.AA$ which is available as a powder from Akzo Chemical Inc., Chicago, Ill. Diethylaluminum chloride (DEAC) and diethylaluminum ethoxide (DEALE) would serve as the preferred activators and are available in the hydrocarbon soluble liquid form from Akzo Chemical. The Ziegler-Natta catalyst would be slurried in a hydrocarbon solvent like kerosene, along with the activators which are soluble in kerosene. Because the catalyst would be poisoned by the presence of oxygen, the nozzle 10 would be housed in a nitrogen environment. The shell material 18 would be polyethylene glycol 1450 (PEG 1450, available from Union Carbide Chemicals & Plastics Co., Inc., Danbury, Conn. PEG 1450, upon heating to 50° C., may be flowed through annulus 16 of nozzle 10.

The expected flow rate of the core material 14, a mixture of alpha-olefins, would be about 3.17 kg/h and the shell material 18, PE 1450 flow rate would be about 1.36 kg/h. The shell 24 would form relatively rapidly upon cooling in a chilled isopar bath which would be kept at about −20°. This would permit the alpha-olefins to bulk polymerize on a small scale within the shell 24. The MDRAs 26 would be kept in a cooled environment (from about −20° C. to about 0° C.) for about 24 to 72 hours to ensure that high conversions, from monomer to polymer, are achieved. At this stage, the core 22 would be essentially greater than 95% polymer.

The expected diameter of the final polymer core 22 would be about 400 $\mu$m, whereas the expected outer diameter of the shell 24 would be about 500 $\mu$m, giving a shell thickness of about 50 $\mu$m. The production rate would be about 4.53 kg/h of MDRA having a payload of about 70% active polymer. The above mentioned production rate would be expected when one nozzle is used, and the rate could be easily increased by simply expanding the number of nozzles.

The completed MDRA particles would not cold flow together, and may be easily handled and transported. The particular MDRA of this Example would be suitable for inclusion in a flowing hydrocarbon stream, such as a crude oil in a pipeline. The MDRA particles would be shipped to pipeline injection sites in bags or super sacks. Locally available water would be used to prepare a slurry of MDRA particles in an agitated container, before injection into the crude oil pipeline. No special injection equipment would be expected to be necessary with such a slurry, or any of the MDRAs of this invention. It is expected that the MDRA PEG 1450 shell would rapidly dissolve in water and release the active polymer core (which is the drag reducing polymer for crude oil). When this slurry would be injected into the oil pipeline, the active polymer would be rapidly distributed through the entire cross section shortly after the injection point in the pipeline. The dispersed DRA particles would then dissolve in the crude oil and effect drag reduction.

EXAMPLE 2

This Example would illustrate the microencapsulation of preformed polymer DRA present in a slurry made by a controlled precipitation process. This portion of the Example is similar to that of Example 12 of U.S. patent application Ser. No. 08/496,489, incorporated by reference herein.

The precipitation portion of the inventive process would be carried out in a Ross double planetary mixer. One hundred parts by weight of a 10% solution of FLO 1012 in isopentane would be charged to the mixer. In a separate vessel, 2 parts of magnesium stearate would be slurried in 100 parts of isopropyl alcohol. The magnesium stearate/alcohol slurry would be added in slowly to the copolymer solution with agitation over a two hour period. This procedure would produce a finely divided polyolefin precipitate which would be essentially a dispersion of very fine polymer DRA particles 100 μm to 150 μm) in isopropyl alcohol and isopentane. After precipitation, the concentration of polymer in the slurry would be about 5 wt. %. The isopentane, which would be the polymerization solvent, would be removed by simply heating the slurry, under agitation, slowly to 80° C. It might be advantageous to apply a vacuum to speed up the process. Now, the concentration of polymer in the slurry would be about 9 wt. %. At this stage 19 parts of water would be added to 100 parts of slurry. The polymer slurry could be further concentrated by continuing the application of heat and vacuum to remove the isopropyl alcohol. It is desirable to get the polymer content up as high as possible while still maintaining a fluid/flowable slurry.

When most of the isopropanol had been removed, the polymer content would be about 30 wt. %. At this stage, 10 parts of polyethylene wax would be added to 100 parts of the 30 wt. % polymer slurry in water. The polyethylene wax will melt at temperatures close to 80° C. and will exist a liquid droplets in water. In the presence of DRA polymer particles, the polyethylene wax will coat the DRA particles because of their common hydrophobicity towards water. In essence, a liquid coating or shell of polyethylene wax will form around the DRA polymer particles. This slurry would then be spray-dried to remove the water and the resulting product would be a dry powder, which is essentially DRA polymer particles encapsulated in polyethylene wax. The concentration of DRA polymer in the final product would be about 70 wt. %.

The MDRA particles would be shipped to pipeline injection sites in bags or super sacks, where it can be easily slurried in the locally available water, in an agitated container. A small heated zone will melt the polyethylene wax coating and release the DRA particle just prior to injection into the flowing crude oil stream. The DRA particles would disperse rapidly and dissolve in the crude oil, and thus drag reduce the crude oil.

EXAMPLE 3

This example would illustrate the microencapsulation of preformed polymer DRA present in a slurry made by a controlled precipitation process. This portion of the example is from Example 12 of U.S. patent application Ser. No. 08/496,489, incorporated by reference herein.

The precipitation portion of the inventive process was carried out in a Ross double planetary mixer. One hundred parts by weight of a 10% solution of FLO 1020 in Isopentane was charged to the mixer. In a separate vessel, 2 parts of magnesium stearate was slurried in 100 parts of isopropyl alcohol. The magnesium stearate/alcohol slurry was added in slowly to the copolymer solution with agitation over a two hour period. This procedure produced a finely divided polyolefin precipitate which is essentially a dispersion of very fine polymer DRA particles (100 μm–150 μm) in isopropyl, alcohol and isopentane. After precipitation, the concentration of polymer in the slurry is about 5 wt %. The isopentane which is the polymerization solvent can be removed by simply heating the slurry, under agitation, slowly to 80° C. It might be advantageous to apply a vacuum to speed up the process. Now, the concentration of polymer in the slurry is about 9 wt %. When the slurry is still at 80° C., polyethylene glycol (PEG 8000) flakes are added. The PEG 8000 is soluble in the hot isopropyl alcohol. The slurry at 80° C. is then processed over a rotating disk, where the isopropyl alcohol is flashed off, and the PEG 8000 coming out of solution coats and encapsulates the DRA particles. The encapsulated DRA particles forms a free flowing powdery product.

The product would be shipped to injection sites in bags or super sacks, where it can easily be slurried in locally available water, in an agitated container. The PEG 8000 shell will dissolve in the water and release the DRA particle. Heat could be applied if desired to speed up the dissolution of the PEG 8000 shell. The aqueous slurry can then be injected into the flowing crude oil stream. The DRA particles will disperse rapidly and dissolve in the crude oil, and thus drag reduce.

EXAMPLES 4–6

In this Example 4, a stationary nozzle technique was used. The nozzle had an inner nozzle ID of 0.047" (about 1200 μm) and an outer nozzle ID of 0.094" (about 2400 μm). The core material 14 was 1000 g of 1-dodecene together with 30 ml of the catalyst formulation of Table 1. The catalyst formulation (slurry) was added to the 1-dodecene to make the core material 14 just prior to its extrusion into the nozzle 10.

TABLE I

Example 4 Catalyst Formulation

| Compound | Amount wt., g | vol., ml | m, moles | Formula Weight | Density g/ml | Comments |
|---|---|---|---|---|---|---|
| $TiCl_3$, AA catalyst | 0.8 | — | 4 ($TiCl_3$) | 592 | — | Powder-77.61% is $TiCl_3$ |
| DEAC | 3.86 | 5.2 | 8 | 120.56 | 0.742 | 25% soln. in heptane |
| DEALE | 2.08 | — | 4 | 130.17 | — | 25% soln. in heptane |
| Solvent (kerosene) | 30 | — | — | — | — | Pure liquid |

The nozzle 10 was housed in a nitrogen environment. The shell material 18 as methoxylated polyethylene glycol 1450 (PEG m1450, available from Union Carbide Chemicals & Plastics Co., Inc., Danbury Conn. Hydroxyl functional groups are capable of poisoning the catalyst thus a methoxylated form of PEG was selected. It is anticipated that shell materials can be extended to PEG/PPG, PEG/PEO, and mPEG/PEG blends of different molecular weights. mPEG 1450, upon heating to a temperature of about 13° F. (about 57° C.), was flowed through annulus 16 of nozzle 10. The shell formulation was modified to include PEG 300 as a plasticizer.

The shell 24 formed rapidly upon cooling in a chilled ISOPAR-E bath which was kept at between −20 and −40° F. (approximately −29 to −40° C.). ISOPAR-E is a synthetically produced isoparaffinic solvent sold by Exxon Chemical Co. The capsules were removed from isopar-E collection and placed in a 4 oz. jar and purged with nitrogen to prevent catalyst oxidation. The capsules remained unpoisoned for over more than 5 hours. This permitted the 1-dodecene to bulk polymerize on a small scale within the shell 24.

Successful microcapsules were prepared in the size ranging between 750 and 1500 μm, and having an approximate payload of 25 weight %.

The completed MDRA particles did not cold flow together, and were easily handled and transported. The particular MDRA of this Example would be suitable for inclusion in a flowing hydrocarbon stream, such as a crude oil in a pipeline, if increased in concentration.

The entire sample was added to 100 gm of water o dissolve the mNPEG shell, and to phase separate the core phase for drag reduction evaluation. Using a separatory funnel, about 8 g of the top phase, containing polymer in 1-dodecene and ISOPAR-E was recovered. A part of the recovered polymer (poly-1-dodecene) was diluted down to 6.92 ppm polymer for drag reduction analysis, which was considered to be the ultimate test for the effectiveness of the DRA polymer.

At 6.92 ppm polymer concentration, a 30.4% drag reduction (% DR) was observed. Later, Examples 5 and 6 were conducted similarly to Example 4. The top and bottom phases were recovered after dissolution in water. The Examples 5 and 6 materials were analyzed for drag reduction at 7 ppm and a 26.7% DR and 30.4% DR were obtained, respectively, showing that the polymerization can be reproduced consistently within the microcapsule.

The inventive microencapsulated drag reducing agents would have the advantages of quick dissolution in flowing liquids, injection into the liquids without the benefit of injection probes or other specialized equipment, and would not require any grinding of the polymer. Very importantly, by being microencapsulated in a protective shell, the drag reducing polymers would not cold flow together and cause handling problems. Additionally, since the MDRA would be almost entirely polymer, that is, have a very high concentration of polymer, with only catalyst and shell otherwise being present, the amount of material that would have to be shipped and handled would be greatly reduced. That is, no solvent would be present to dilute the active drag reducer and increase production and transportation costs. Further, the inventive MDRAs would be expected to give exceptionally good drag red results at low concentrations, since the active polymer drag reducer is proven.

Many modifications may be made in the composition and implementation of this invention without departing from the spirit and scope thereof which are defined only in the appended claims. For example, the exact combination of DRA polymer, shell material, and catalyst may be different from those used here. Particular processing techniques may be developed to enable the shell and polymer portions of the MDRA to work together well.

We claim:

1. A microencapsulated compound for modifying a characteristic of a fluid, comprising:
    a core comprising the compound selected from the group consisting of: polymers formed within the shell; and
        monomers which are polymerized within the shell, where the shell is inert to the monomer polymerization; and
    a shell encapsulating the core, where the shell is inert to the core.

2. The microencapsulated compound of claim 1 where the compound is selected from the group consisting of:
    compounds for modifying physical characteristics of the fluid, where the physical characteristics are selected from the group consisting of: viscosity;
    flow resistance (drag); and
    surface activity; and
    compounds for modifying chemical characteristics of the fluid, where the chemical characteristics are selected from the group consisting of:
    corrosivity;
    scale formation;
    polymerization;
    inhibition of polymerization; and
    pH.

3. The microencapsulated compound of claim 1 where the compound is a drag reducing agent that modifies the flow resistance of the fluid.

4. The microencapsulated compound of claim 1 where the greatest outside dimension thereof is about 1000 microns or less.

5. A microencapsulated compound for modifying a characteristic of a fluid, comprising:
    a core comprising the compound, where the compound is selected from the group consisting of polymers formed within the shell; and
        monomers which are polymerized within the shell, where the shell is inert to the monomer polymerization; and
    where the compound is further selected from the group consisting of compounds for modifying physical characteristics of the fluid, where the physical characteristics are selected from the group consisting of:
    viscosity;
    flow resistance (drag); and
    surface activity; and
    compounds for modifying chemical characteristics of the fluid, where the chemical characteristics are selected from the group consisting of:
    corrosivity;
    scale formation;
    polymerization;
    inhibition of polymerization; and
    pH;
    a shell encapsulating the core, where the shell is inert to the core, where the greatest outside dimension of the shell is about 1000 microns or less.

6. A microencapsulated drag reducing agent (MDRA) for reducing drag in a liquid stream comprising:
    a core reaction material comprising a monomer; and
    a shell encapsulating the core reaction material, where the shell is inert to the monomer polymerization; where the diameter of the MDRA is 1000 microns or less, and where the monomer is polymerized within the shell.

7. The MDRA of claim 6 where the monomer is an alpha-olefin.

8. The MDRA of claim 6 where the core reaction material has an absence of solvent for the monomer.

9. The MDRA of claim 6 where the core reaction material further comprises a catalyst to polymerize the monomer.

10. The MDRA of claim 9 where the monomer is an alpha-olefin, and the catalyst is a Ziegler-Natta catalyst.

11. The MDRA of claim/where the shell is coated with an anti-agglomeration agent.

12. The MDRA of claim 6 where the core reaction material is encapsulated by the shell using a microencapsulation process selected from the group consisting of stationary extrusion, centrifugal extrusion, vibrating nozzle, submerged nozzle extrusion, rotating disk, interfacial polymerization, complex coacervation, suspension polymerization, and in situ polymerization.

13. The MDRA of claim 6 where the shell is soluble in a delivery medium to be introduced into the liquid stream.

14. The MDRA of claim 6 where the shell is selected from the group of materials consisting of polybutylene, polymethacrylates, waxes, polyethylene glycol (PEG), methoxylated PEG, polyethylene oxide, stearic acid, and polyethylene waxes.

15. The MDRA of claim 6 where the monomer is polymerized using UV radiation.

16. A microencapsulated drag reducing agent (MDRA) for reducing drag in a liquid stream, where the MDRA is produced by a process comprising:

providing a slurry of drag reducing polymer particles in a liquid which is a non-solvent for the polymer particles;

adding to the slurry a shell material for which the liquid is also a non-solvent;

forming shells around the polymer particles using the shell material; and removing at least a portion of the non-solvent liquid;

where the diameter of the MDRA is 1000 microns or less.

17. The MDRA of claim 16 where the core material comprises from about 80 to 100% polymer.

18. The MDRA of claim 16 where the polymer is polyalpha-olefin.

19. The MDRA of claim 16 where the shell is coated with an anti-agglomeration agent.

20. The MDRA of claim 16 where the microencapsulation process to make the MDRA is selected from the group consisting of rotating disk, interfacial polymerization, complex coacervation, and suspension polymerization.

21. The MDRA of claim 16 where the shell is soluble in a delivery medium.

22. The MDRA of claim 16 where the shell is select from the group of materials consisting of polybutylene, polymethacrylates, waxes, polyethylene glycol (PEG), methoxylated PEG, polyethylene oxide, stearic acid, and polyethylene waxes.

* * * * *

UNITED STATES PATENT AND TRADEMARK OFFICE
Certificate

Patent No. 6,126,872                                                 Patented: October 3, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Nagesh S. Kommareddi, Tulsa, OK; Lawrence J. Rzeznik, Spring, TX; Niraj Vasishtha, San Antonio, TX; and Darren Eugene Barlow, San Antonio, TX.

Signed and Sealed this Thirtieth Day of March 2004.

JAMES J. SEIDLECK
*Supervisory Patent Examiner*
Art Unit 1711